United States Patent
Brauser et al.

(10) Patent No.: US 8,926,154 B1
(45) Date of Patent: Jan. 6, 2015

(54) LED DEVICE HAVING PRINTABLE LAYER AND RETENTION FEATURE

(71) Applicants: Gregory Brauser, Fort Lauderdale, FL (US); Brandon Bal, Fort Lauderdale, FL (US)

(72) Inventors: Gregory Brauser, Fort Lauderdale, FL (US); Brandon Bal, Fort Lauderdale, FL (US)

(73) Assignee: Dog-E-Glow, Inc., Fort Lauderdale, FL (US)

(*) Notice: Subject to any disclaimer, the term of this patent is extended or adjusted under 35 U.S.C. 154(b) by 0 days.

(21) Appl. No.: 13/869,333

(22) Filed: Apr. 24, 2013

Related U.S. Application Data

(63) Continuation-in-part of application No. 13/299,973, filed on Nov. 18, 2011, now Pat. No. 8,511,856.

(51) Int. Cl.
*F21L 4/00* (2006.01)
*F21V 21/14* (2006.01)
*F21L 4/02* (2006.01)

(52) U.S. Cl.
CPC . *F21V 21/14* (2013.01); *F21L 4/02* (2013.01); *Y10S 362/80* (2013.01)
USPC ............ 362/570; 362/253; 362/555; 362/800

(58) Field of Classification Search
USPC .................... 362/108, 190, 223, 234, 249.03, 362/249.04, 249.08, 253, 555, 565, 570, 362/577, 800; 119/859
See application file for complete search history.

(56) References Cited

U.S. PATENT DOCUMENTS

| | | | |
|---|---|---|---|
| 5,366,780 A | 11/1994 | Rapisarda | |
| 5,879,076 A | 3/1999 | Cross | |
| 6,146,006 A | 11/2000 | Cross | |
| 6,970,090 B1 | 11/2005 | Sciarra | |
| 7,064,498 B2 | 6/2006 | Dowling et al. | |
| 7,140,327 B2 | 11/2006 | Morehead | |
| 2005/0213351 A1* | 9/2005 | Yang | 362/633 |
| 2009/0080208 A1* | 3/2009 | Droste et al. | 362/509 |
| 2010/0277943 A1* | 11/2010 | Hurwitz | 362/555 |
| 2011/0043914 A1* | 2/2011 | Hurwitz | 359/530 |

* cited by examiner

*Primary Examiner* — Anh Mai
*Assistant Examiner* — Meghan Dunwiddie
(74) *Attorney, Agent, or Firm* — Malin Haley DiMaggio & Bowen, P.A.

(57) ABSTRACT

A flexible light transmitting device, comprising a printable layer, a backing layer, and a light-emitting diode strip disposed between the printable layer and the backing layer. The printable layer is translucent to permit transmission of light from the light-emitting diodes through the printable layer when the light-emitting diodes are activated; however, the LED strip remains hidden between the layers. The printable layer is adapted to receive printed indicia by way of thermal printing process. The backing layer is substantially opaque comprises a durable nylon webbing or polypropylene material. The embedded LED strip comprises an elongated flexible casing containing spaced apart light-emitting diodes, one or more light interrupting spacers, and at least one ribbon wire extending through the casing and electrically coupling said light-emitting diodes. A fastener is disposed through the printable layer, the strip, and the backing layer to secure the strip to prevent breakage or dislodgment.

11 Claims, 8 Drawing Sheets

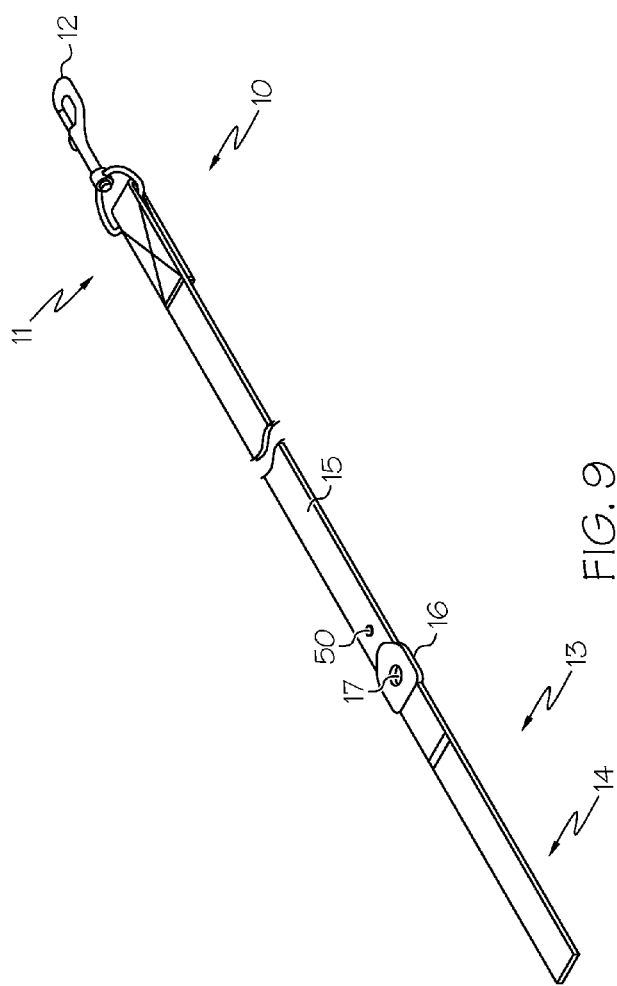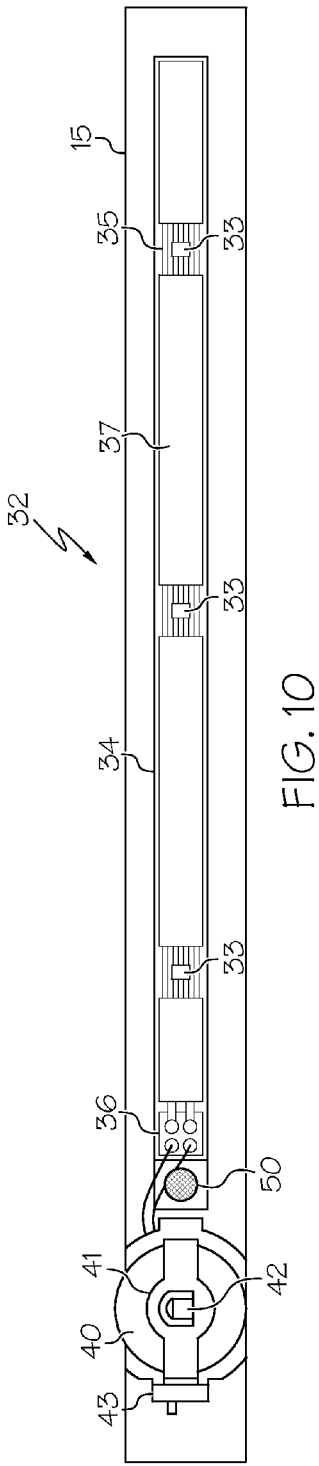

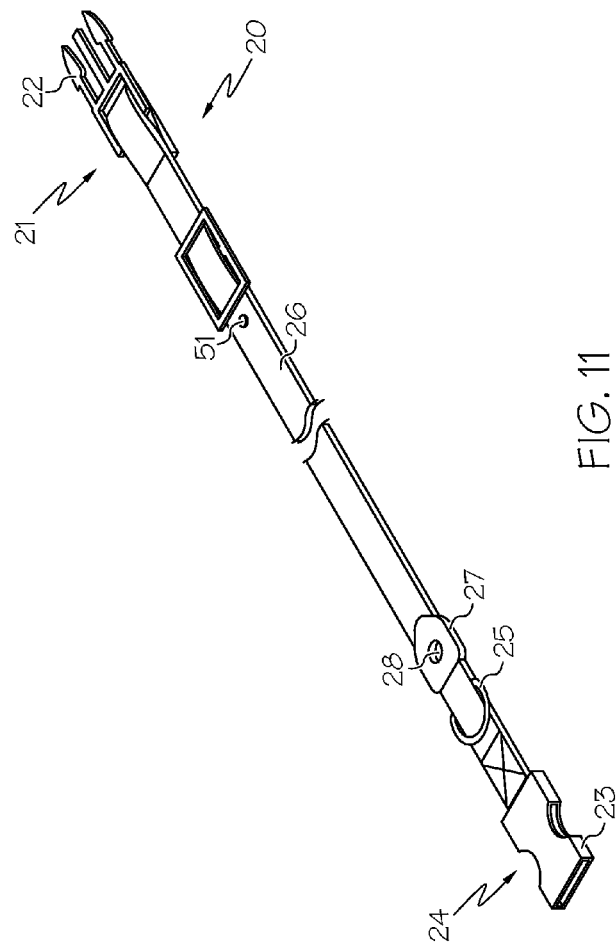
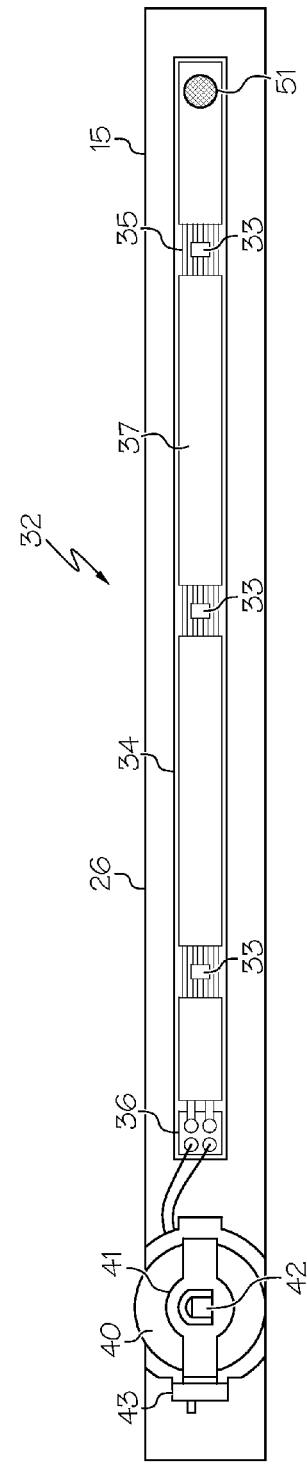
FIG. 11
FIG. 12

LED DEVICE HAVING PRINTABLE LAYER AND RETENTION FEATURE

CROSS REFERENCE TO RELATED APPLICATIONS

This application is a continuation in part of U.S. patent application Ser. No. 13/299,973 filed on Nov. 18, 2011.

STATEMENT REGARDING FEDERALLY SPONSORED RESEARCH OR DEVELOPMENT

N/A

BACKGROUND OF THE INVENTION

1. Field of the Invention

The present invention generally relates to wearable LED devices and more particularly to flexible LED devices having a printable layer.

2. Description of Related Art

A light-emitting diode (hereafter "LED") is a semi-conductor light source that provides discrete light when powered by an electric source. Traditional LEDs emitted low-intensity red light, however more modern versions are capable of emitting light across the entire visible light spectrum at varying levels of intensity. LEDs are useful for a variety applications but are particularly useful for safety and decorative wearable products, including belts, bracelets, pet collars, and pet leashes. Much of the prior art in this field has been limited to providing LEDs within clear plastic tubing that, while providing the desired safety lighting, leaves much to be desired aesthetically. Further, the prior art does not provide for activating buttons that are less prone to inadvertent activation, or that provide a master on/off switch, which is particularly useful when the device is being worn by a child or pet.

For example, U.S. Pat. Nos. 5,879,076 and 6,146,006 to Cross describe an apparatus for the transmission of light adapted in a belt or vest article having a light source that transmits light along a self-support elongated light transmitting member. The light source and light transmitting members are embedding in a casement having a light-colored backing and a translucent front material. The device is activated by a simple on/off switch located proximal to the light source. The required light transmitting members greatly increase the overall weight of the device and increase the number of parts required, tooling costs, and manufacturing costs while limiting the flexibility and usability of the wearable device. Additionally, the on/off switch is prone to inadvertent activation.

U.S. Pat. No. 6,970,090 to Sciarra describes a pet tracking collar comprising clear flexible tubing containing a plurality of LEDs and an antenna and a radio transmitter. The collar provides only safety lighting and radio transmission features and does not provide for as particularly elegant and aesthetically pleasure configuration.

U.S. Pat. No. 7,140,327 to Morehead provides a pet collar having an illumination source and one or more fiber optic cables coupled to the illumination source in order to provide for transmission of the light. The device is activated by an on/off button near the illumination source, which must be exposed from the casement in order to be activated. While providing safety lighting, the fiber optic cables are expensive, difficult to install, and have a high failure rate. Additionally, the invention does not provide for a useful and aesthetically pleasing casement.

Accordingly, while there are certain wearable LED devices present available, none provide an enhanced casement that can include a variety of printable patterns and designs while still maintaining a high level of light transmission. Further, the prior art fails to disclose a suitable on/off button or switch design that prevents inadvertent activation of the LEDs while being compact, discrete, and visually appealing.

It is, therefore, to the effective resolution of the aforementioned problems and shortcomings of the prior art that the present invention is directed. However, in view of the LED and similar light-emitting devices in existence at the time of the present invention, it was not obvious to those persons of ordinary skill in the pertinent art as to how the identified needs could be fulfilled in an advantageous manner.

SUMMARY OF THE INVENTION

The present invention provides various embodiments of a flexible light transmitting device, generally comprising a printable layer, a backing layer, and a light-emitting diode strip disposed between the printable layer and the backing layer. The printable layer is translucent to permit transmission of light from the light-emitting diodes through the printable layer when the light-emitting diodes are activated; however, the printable layer is such that the circuitry and components of the LED strip are not visible therethrough. In some embodiments, the printable layer is a polyester material adapted to receive printed indicia by way of thermal printing process. The backing layer is substantially opaque and may comprise a durable nylon webbing or polypropylene material. A fastener is disposed through the printable layer, the strip, and the backing layer to secure the strip to prevent breakage or dislodgment of the LED strip or the circuitry and components.

The embedded LED strip comprises an elongated flexible casing containing the spaced apart light-emitting diodes, one or more light interrupting spacers disposed between the light-emitting diodes, and at least one ribbon wire extending through the casing and electrically coupling said light-emitting diodes. Further, the light-emitting diodes are electrically coupled to a switch assembly which comprises a battery, a master switch, and a toggle button. The switch assembly provides the LED switch with a plurality of operative modes including an on mode, and off mode, and a flashing mode. In some embodiments, the toggle button is used to toggle between the various operating modes, but the toggle button is only active when the master switch is in the "on" position. This prevents inadvertent activation of the light-emitting diodes. The device of the present invention may be configured as a variety of wearable and useful items such as a bracelet, necklace, pet collar, pet leash, vest, belt, and the like.

Accordingly, it is an object of the present invention to provide an enhanced LED device that includes a hidden or stealth LED strip underneath a printable layer that can include a variety of printed patterns, colors, and indicia.

It is another object of the present invention to provide an enhanced LED device that is operable between a plurality of operating modes, including off, on, flashing, and breathing.

It is yet another objection of the present invention to provide an LED device that includes a switch assembly that prevents inadvertent activation of the light-emitting diodes.

It is another object of the present invention to provide an LED device that includes a battery tray to allow the user to easily change the battery.

It is yet another object of the present invention to provide an LED device that is integrated, attractive, and aesthetically pleasing while providing relatively high intensity light transmission for decorative and safety purposes.

It is yet another object of the present invention to provide an LED device is durable and resistant to tearing, breakage, or other damage.

In accordance with these and other objects which will become apparent hereinafter, the instant invention will now be described with particular reference to the accompanying drawings.

BRIEF DESCRIPTION OF THE DRAWINGS

FIG. 9 is a top view of one embodiment of the present invention, configured as a pet leash, having an additional snap retention feature.

FIG. 10 is a cut-away top view of one embodiment of the LED strip of the present invention configured as a leash, having an additional snap retention feature.

FIG. 11 is a top view of one embodiment of the present invention, configured as a pet collar, having an additional snap retention feature.

FIG. 12 is a cut-away top view of one embodiment of the LED strip of the present invention configured as a collar, having an additional snap retention feature.

DETAILED DESCRIPTION

Figure 1:
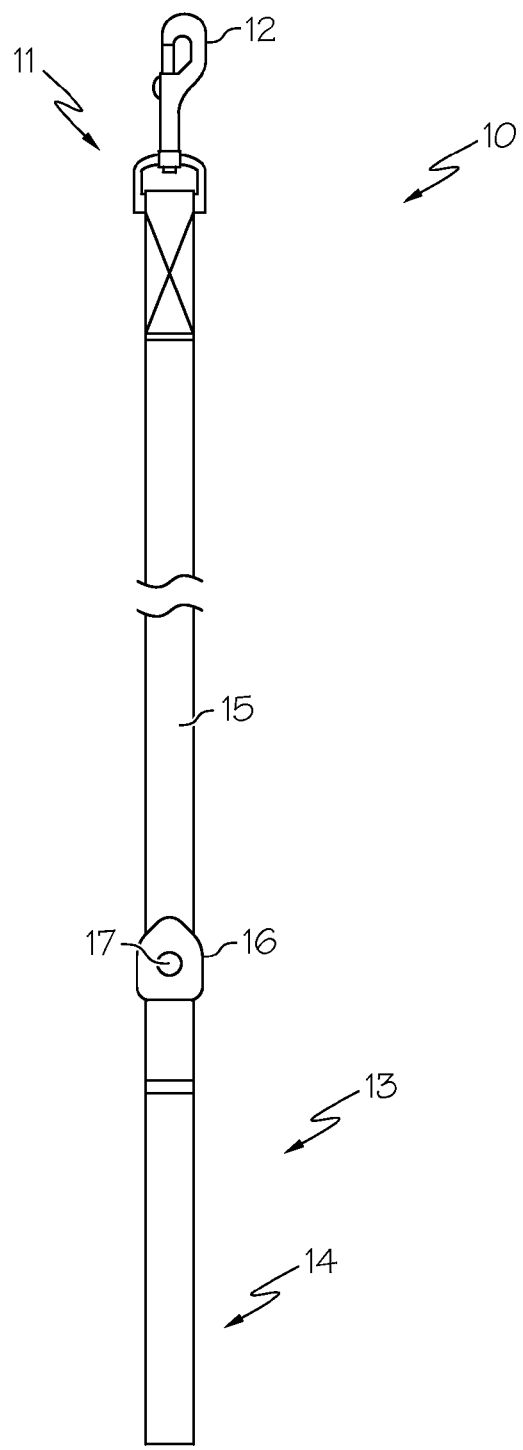
FIG. 1 is a top view of one embodiment of the present invention, configured as a pet leash.

With reference to FIG. 1, shown is one embodiment of the LED device 10 of the present invention, configured as a pet leash. Device 10 includes a proximal end 11 having a snap-release hook 12 and a distal end 13 having a loop 14. Hook 12 is received on an element such as a ring, loop, or other member, which secures the proximal end 11 thereto. In some embodiments, hook 12 is received on the ring of a pet collar. Loop 14 at the distal end 13 can receive a user's hand or can be placed over or around rigid body to secure device 10. Disposed between the proximal 11 and distal end 13 is an elongated leash body 15, which may be of any desired length. Disposed substantially toward the distal end 13, but preferably proximal from the loop 14 is switch assembly 16 which includes a toggle button 17. The location of the switch assembly 16 along the length of device 10 should not be considered limiting as there are other locations that may be equally suitable. However, having the button assembly 16 located toward the distal end 13 generally provides easier access thereto for the user.

Figure 2:
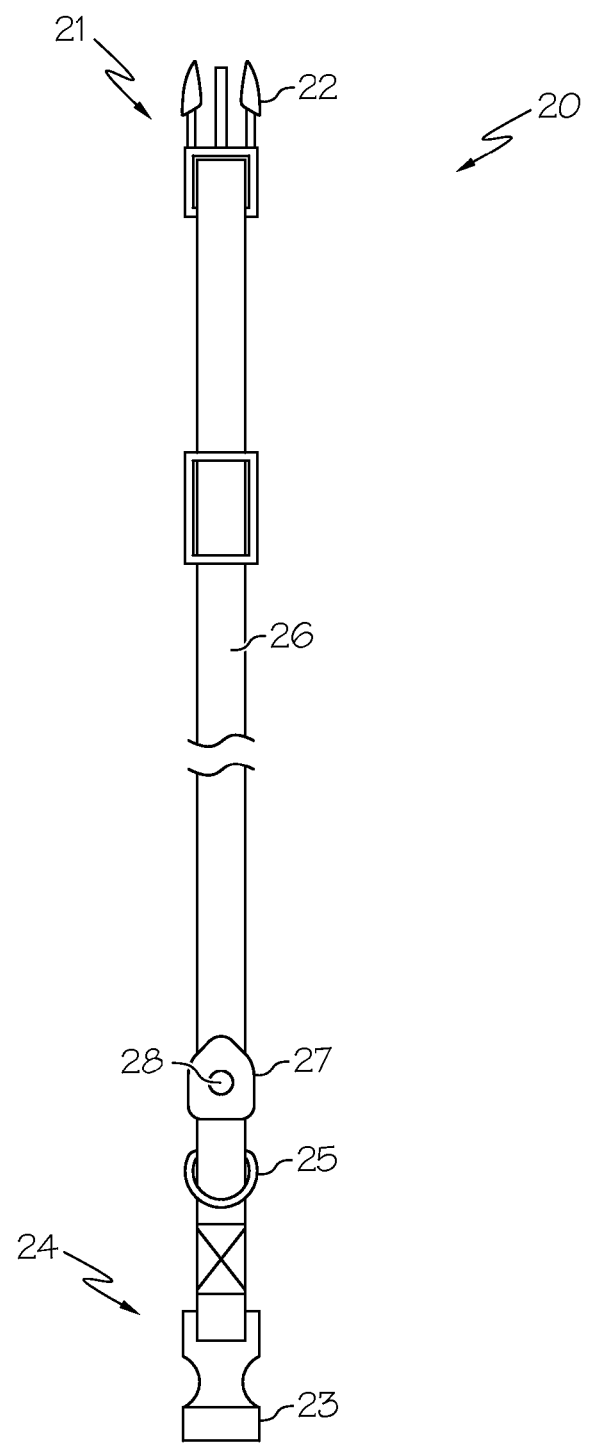
FIG. 2 is a top view of one embodiment of the present invention, configured as a pet collar.

With reference to FIG. 2, shown is another embodiment of the present invention, designated as device 20, which is configured as a pet collar. Disposed at proximal end 21 is a male clip-end 22 which is received by the female clip-end 23 located at distal end 24. Also disposed substantially toward the distal end 24 is an attachment ring 25, which is adapted to receive an attachment hook, clip, or snap, such as the snap-release hook 12 shown in FIG. 1. Extending between the proximal end 21 and distal end 24 of device 20 is elongated collar body 26, which may be of any desired length. Disposed substantially toward the distal end 24, but preferably proximal from the female clip-end 23 is switch assembly 27 which includes a toggle button 28. The location of the switch assembly 27 along the length of device 20 should not be considered limiting as there are other locations that may be equally suitable. Accordingly, it is apparent that device 20 defines a pet collar which is secured around the neck or torso of a pet, such as a dog, and provides a point of attachment to restrain the pet with, for example, a leash like that of device 10 shown in FIG. 1.

Figure 3:
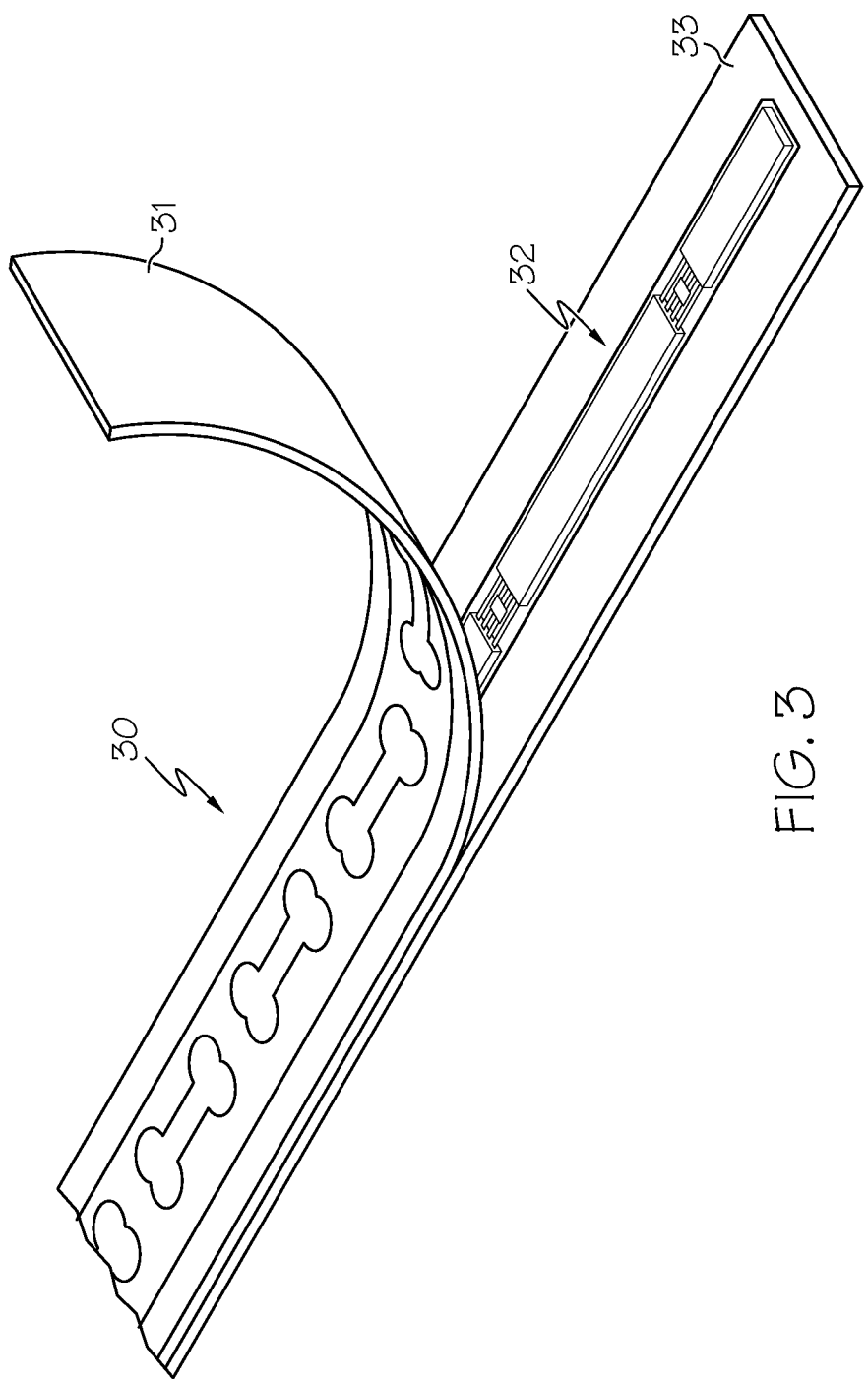
FIG. 3 is a perspective view of a portion of the body of one embodiment of the present invention.

With reference to FIG. 3, shown is one embodiment of the elongated body 30 of the LED device of the present invention, which corresponds to the leash body 15 and collar body 26 discussed above and shown in FIGS. 1 and 2. Body 30 comprises at least three elements, including a translucent printable layer 31, an LED strip 32, and a backing layer 33. The LED strip 32 is disposed between the translucent printable layer 31 and the backing layer 33. In some embodiments, the backing layer 33 comprises a substantially opaque nylon or polypropylene plain weave webbing material having suitable strength and deformity resistance as is typical of belts, collars, and leashes. In some embodiments, the printable layer 31 comprises a weatherproof plain weave polyester material that is adapted to receive printable indicia by way of a thermal printing process. More specifically, a polyvinyl chlorate (PVC), Polyethylene terephthalate (PET), or other like thermoplastic polymer film containing a pattern, logos, pictures, words, or other indicia in various colors is provided over the printable layer 31 and heat is applied thereto, which transfers the indicia from the film onto the printable layer 31. Further, the polyester material of the printable layer 31 is such that the layer 31 is at least partially translucent, as discussed in further detail below. The edges of the printable layer 31 and the backing layer 33 may be sewn or hot-melted together in order to secure LED strip 32 therebetween. Other means of securing the layers 31 and 33 to one another may be equally suitable. While polyester is particularly suitable, other like materials may be used for printable layer 31 provided they are capable of retaining a colorlast ink or other printed medium. Furthermore, it is appreciated that the printable layer 31 is weatherproof in order to prevent water from seeping into and damaging the LED strip 32. The backing layer 33 should also be suitably weatherproof for the same reasons.

Figure 4:
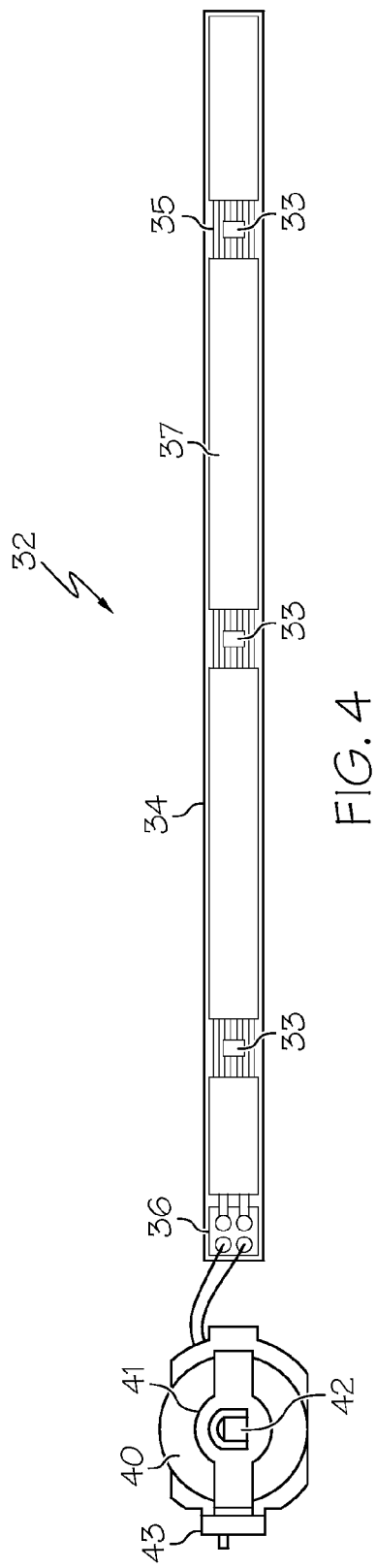
FIG. 4 is a top view of one embodiment of the LED strip of the present invention.

FIG. 4 depicts LED strip 32 in more detail. As shown, strip 32 comprises a plurality of LEDs 33 spaced apart and disposed within an elongated flexible casing 34. Disposed between each of the LEDs and also contained within casing 34 are elongated light-interrupting spacers 37. In some embodiments, the spacers 37 comprise two layers. A plurality of ribbon wires 35 are disposed along the length of the strip 32 and electrically couple the LEDs 33. In some embodiments, the ribbon wires 35 are disposed between the two layers of the spacers, except that at least a portion of the wires 35 are exposed proximal to the LEDs 33. Accordingly, spacers 37 provide a conduit through which wires 35 pass, while also serving to limit light transmission therethrough so that light emitted by LEDs 33 does not "bleed" along the length of the LED strip 32, which would otherwise reduce the intensity of the LEDs 33 proximal to their location.

Figure 5:
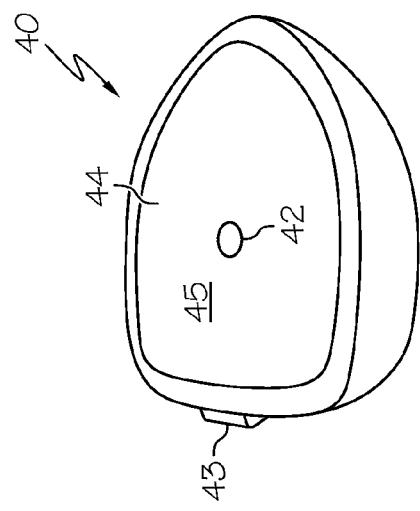
FIG. 5 is a perspective view of one embodiment of the button assembly of the present invention.

The ribbon wires 35 also connect the series of LEDs 33 to a connector 36. Connector 36 is in turn electrically coupled to switch assembly 40 (which is the same structure as switch assembly 16 and 27 discussed above), which is proximal to connector 36. In FIG. 4, switch assembly 40 is shown in cutaway, in order to better visualize the internal components thereof. Accordingly, in some embodiments, switch assembly 40 comprises a printed circuit board 41, a toggle button 42, and a master switch 43. FIGS. 5-8 show the various structural components of switch assembly 40. FIG. 5 shows switch assembly 40 in its assembled state, having a housing 44 with master switch 43 disposed on a side thereof, and toggle button 42 disposed on a top surface thereof. A covering label 45 may be placed over toggle button 42, whereby the label 45 is flexible to maintain the toggling action of toggle button 42 and provides a surface for indicia such as logos or patterns.

Figure 6A:
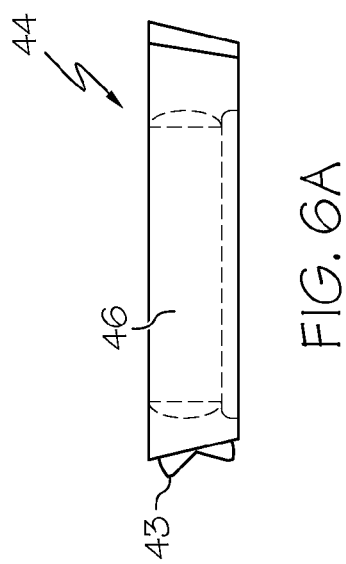
FIG. 6A is a side view of one embodiment of the switch assembly of the present invention.
Figure 6B:
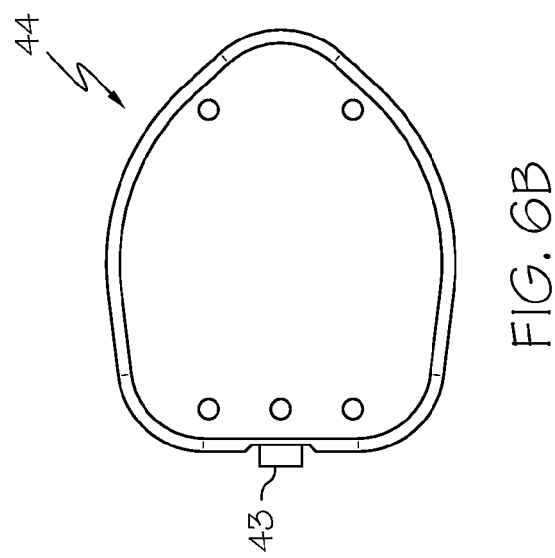
FIG. 6B is a top view of one embodiment of the switch assembly of the present invention.
Figure 6C:
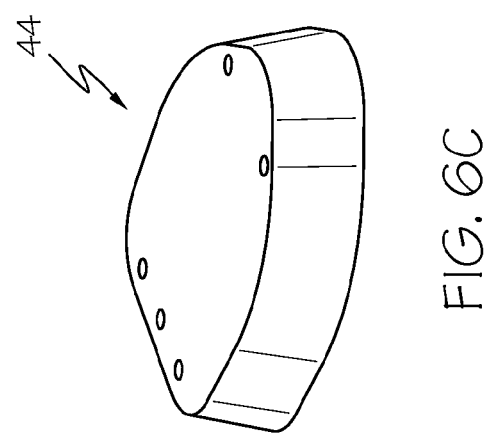
FIG. 6C is a perspective view of one embodiment of the switch assembly of the present invention.
Figure 7A:
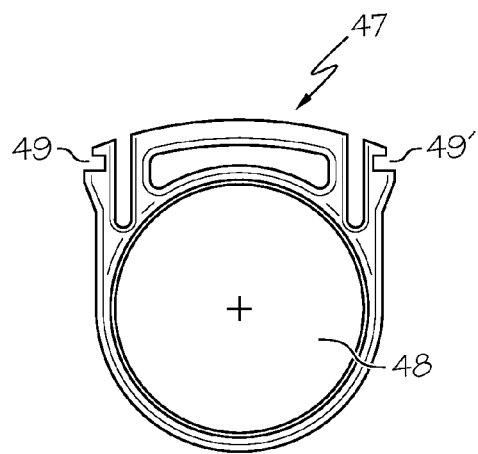
FIG. 7A is a top view of one embodiment of the battery tray of the present invention.
Figure 7B:
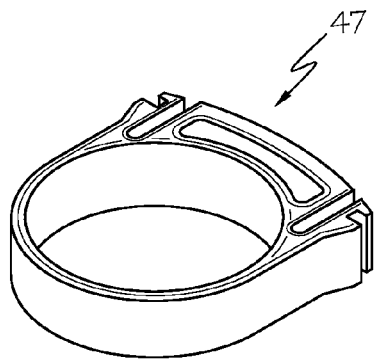
FIG. 7B is a perspective view of one embodiment of the battery tray of the present invention.
Figure 8:
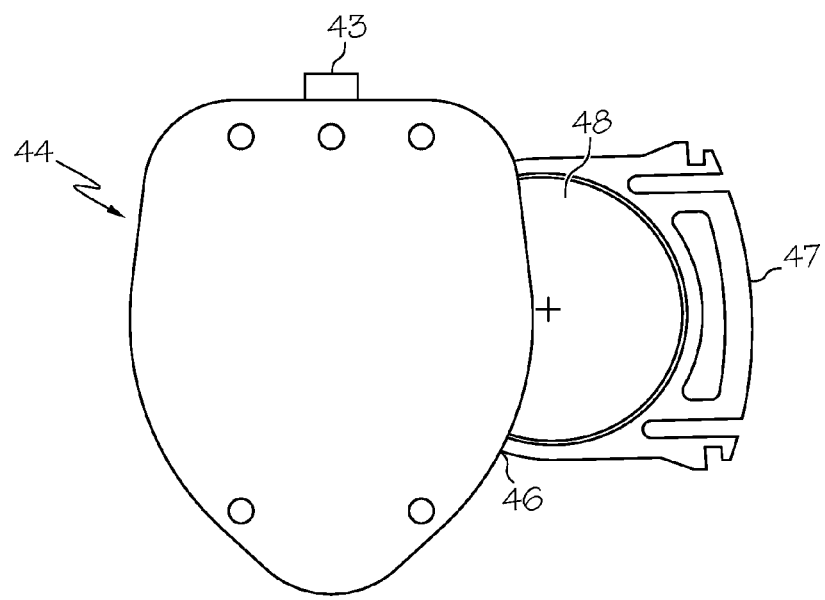
FIG. 8 is a perspective view of one embodiment of the present invention, showing the battery tray being inserted into the switch assembly thereof.

FIGS. 6A-6C depict one embodiment of housing 44 of the switch assembly 40. As shown in FIG. 6A, a side of switch assembly 40 includes a slot 46 which is adapted to receive a battery holder tray 47 shown in FIGS. 7A and 7B. In some embodiments, battery holder tray 47 is configured to receive a coin-style battery 48. Tray 47 is removably received within slot 46 as shown more particularly in FIG. 8. Accordingly, in some embodiments, disposed within slot 46 may be as spring or other resilient member which applies force against tray 47 in order to aid in insertion and removal of tray 47 when desired. Tray 47 may further include flexible protrusions 49 and 49' on either side thereof, which are depressed by the user during insertion in slot 46 and which later expand in order to secure tray 47 within slot 46. The tray-slot engagement provides for much easier replacement of battery 48 as compared to known designs, which typically require the user to remove one of the panels of the switch assembly, which is typically held down by a screw.

Referring back to FIG. 3, the printable layer 31 and backing layer 33 are configured to provide optimum lighting response from the LEDs 33 of strip 32. The printable layer 31 is configured to be relatively opaque such that the structural components of the LED strip 32 are not visible therethrough. However, printable layer 31 is translucent enough to allow a substantial portion of the light emitted from LEDs 33 to pass through and be visible to the human eye. In some embodiments, printable layer 31 comprises a white polyester which receives printed indicia in any desired color or combinations of colors, patterns, and the like. The white polyester material is stranded or weaved such that it allows light from LEDs 33 to pass through, but is sufficiently opaque as to render the actual LED strip 32 un-visible. This gives body 30 the appearance that the LEDs 33 are completely hidden or "stealth" until activated by the user. In some embodiments, the backing layer 33 is less translucent than printable layer 33 so that the majority of the light emitted from LEDs 33 will transmit through printable layer 31, which is preferably the side of the device that is facing outward to the user. However, in some embodiments, light emitted from LEDs 33 will be visible through both layers 31 and 33. Further, the light-interrupting spaces 37 of LED strip 32 are configured such that light emitted from LEDs 33 is radiated substantially proximal to the LEDs 33, and will not tend to bleed down the length of the LED strip 32. This configuration results in a device that appears to have a plurality of discrete lights spaced apart in series.

By way of example, in some embodiments, printable layer 31 comprises a 100% plain weave polyester material specified as 1' webbing, 150 D, 10 g/yard and approximately 1.0 mm thick. A ¾" polyester webbing may also be provided as printable layer 31, specified as 150 D, 7.5 g/yard, and approximately 1.0 mm thick. Backing layer 31 may comprise a 100% plain weave polypropylene material at 1" specified as 900 D, 16 g/yard, 1.5 mm thick or at ¾" specified as 900 D, 12 g/yard, 1.5 mm thick. These specifications are not limiting as other sizes and specifications may be selected depending on the desired light transmission properties of the constituent layers 31 and 33. Further, other suitable materials may be utilized provided they are suitably weatherproof and, in the case of the printable layer 31, are capable of retaining a colorlast ink or other printable medium.

Referring back to FIG. 4, switch assembly 40 is manipulated by the user to activate the LEDs 33 on-demand. Circuit board 41 contains a chipset and the necessary electrical contacts for the various components of the present invention. Both master switch 43 and toggle button 42 are electrically coupled to printed circuit board 41, which is electrically coupled to connector 36. Circuit board 41 is configured to receive power from battery 48, and can open and close the electrical contacts in order to send power to the various components. In some embodiments, switch assembly 40 is configured such that master switch 43 has at least two positions, a master-on position and a master-off position. In the master-off position, the switch assembly is completely off, the LEDs 33 are deactivated, and toggle button 42 is "killed" such that it cannot activate LEDs 33. In some case, in the master-off position, the connection between battery 48 and circuit board 41 is temporarily severed, in order to avoid inadvertent activation of LEDs 33. In the master-on position, power can now be transferred from battery 48 to the various components and toggle button 42 is now active and can be depressed to activate LEDs 33.

The logic contained within the chipset of circuit board 41 is such that toggle button 42 can be depressed by a user in sequence to operatively select a plurality of operating modes, including "off," "on," and "flashing." For example, beginning in the "off" mode, depressing toggle button 42 once will enter the "on" mode and power will be sent from battery 48, through circuit board 41 to connector 36, along wires 35 and to LEDs 33. Depressing toggle button 42 again will enter the "flashing" mode, whereby the logic within circuit board 41 intermittently sends power from battery 48 along to connector 36, along wires 35 and to LEDs 33 such that LEDs 33 "flash" in intermittent fashion. Depressing toggle button 42 once again will return the device to the "off" position. Additional modes may be contemplated, such as a pulsating or "breathing" mode and/or faster or slower "flashing" intervals. These modes and their specific timing and functionality are dictated by the logic embedded in circuit board 41. Of course, the sequence of the various modes is also dictated by the logic embedded in circuit board 41 and can vary without departing from the scope of the present invention.

With reference to FIGS. 9-12, shown are additional embodiments of the present invention configured with a snap retention feature in order to improve the durability of the present invention.

FIG. 9 depicts an embodiment of LED device 10 configured as a leash substantially as shown in FIG. 1 and described above. In order to prevent the switch assembly 16 from becoming dislodged from the internal LED strip and further to prevent the internal LED strip from stretching or breaking, a fastener 50 is inserted through the entire leash body 15, i.e. both printable layer and backing layer, in order to secure the internal LED strip to the leash body 15. In some embodiments, the fastener 50 is located adjacent to and proximal from the switch assembly 16. Having the fastener 50 located adjacent and proximal to the switch assembly 16 will assure that the internal LED strip doesn't stretch or break or become dislodged from the switch assembly 16 when tension is applied to the leash device 10 during use. FIG. 10 is a cutaway top view of one embodiment of the present invention in the leash configuration. This cutaway view is similar to that shown in FIG. 4 and described above. As shown, casing 34 is extended such that fastener 50 can be disposed through the body 15 and through the LED strip 32 in order to secure the strip 32 to the body 15. In some embodiments, the fastener is disposed between the switch assembly 40 and connector 36 in order to prevent the connection therebetween from breaking or coming loose when tension is applied to the device. The fastener 50 also alleviates tension of the strip 32 generally in order to prevent stretching, tearing, or breakage thereof.

FIG. 11 depicts an embodiment of LED device 20 configured as a collar substantially as shown in FIG. 2 and described above. In order to prevent the switch assembly 27 from becoming dislodged from the internal LED strip and further to prevent the internal LED strip from stretching or breaking, a fastener 51 is inserted through the entire collar body 26, i.e. both printable layer and backing layer, in order to secure the internal LED strip to the collar body 26. In some embodiments, the fastener 51 is located adjacent to and distal from the clip-end 22. Having the fastener 51 located adjacent and distal from the clip end 22 will assure that the internal LED strip doesn't stretch or break or become dislodged from the switch assembly 27 when tension is applied to the collar device 20 during use. FIG. 12 is a cutaway top view of one embodiment of the present invention in the leash configuration. This cutaway view is similar to that shown in FIG. 4 and described above. As shown, casing 34 is extended such that fastener 51 can be disposed through the body 26 and through the LED strip 32 in order to secure the strip 32 to the body 26. In some embodiments, the fastener is disposed toward the proximal end 21 of the body 26, nearest the clip-end 22 (See again FIG. 11). The fastener 51 alleviates tension of the strip 32 generally in order to prevent stretching, tearing, or breakage thereof.

The fasteners 50 and 51 are effective in reducing the stress and strain on the internal LED strip and related components, including the switch assembly when the device 10 or 20 is in use and under a pulling load. By securing the LED strip to the collar/leash body, the pieces function together and the body is better about to absorb the strain without unduly stretching, tearing, or breaking the LED strip or switch assembly, connectors, and the like. It is appreciated that the fastener may comprise a variety of known structures such as rivets, two-piece snaps, clips, tacks, nails, screws, and the like provided the fastener is capable of penetrating the device body It is appreciated that the LED device of the present invention can be configured in a variety of manners, including as wearable apparel items and other useful products. The present disclosed presents the LED device configured as a wearable pet collar and complimentary pet leash. However, the device could be configured as or integrated into belts, vests, bracelets, necklaces, lanyard keychains, or other items wherein an elongated, flexible body is desired and/or useful. Accordingly, the present invention is not limited to the embodiments discussed herein and shown the figures and other embodiments are well within the scope of the present invention.

Accordingly, the instant invention has been shown and described herein in what is considered to be the most practical and preferred embodiments. It is recognized, however, that departures may be made therefrom within the scope of the invention and that obvious modifications will occur to a person skilled in the art.

What is claimed is:

1. A flexible light transmitting device, comprising a printable layer, a backing layer, and a light-emitting diode strip;

said strip disposed between said printable layer and said backing layer;

a fastener disposed through said printable layer, said strip, and said backing layer to secure said strip to said printable layer and said backing layer;

said strip comprising a plurality of spaced apart light-emitting diodes, an elongated flexible casing containing said light-emitting diodes, one or more light interrupting spacers disposed between said light-emitting diodes, and at least one ribbon wire extending through said casing and electrically coupling said light-emitting diodes;

wherein said light-emitting diodes are electrically coupled to a switch assembly, said switch assembly comprising a battery, a master switch, and a toggle button, said toggle button adapted to activate said light-emitting diodes by way of said battery;

wherein said toggle button activates said light-emitting diodes only when said master switch is in an on position; and wherein said printable layer is translucent to permit transmission of light from said light-emitting diodes through said printable layer.

2. The device of claim 1, wherein said printable layer receives printed indicia by thermal printing.

3. The device of claim 1, wherein said printable layer comprises a polyester material.

4. The device of claim 1, wherein said backing layer is substantially opaque.

5. The device of claim 1, wherein said backing layer comprises nylon.

6. The device of claim 1, wherein said backing comprises polypropylene.

7. The device of claim 1, wherein said light-emitting diodes are configured to provide a plurality of operating modes, including an off mode, an on mode, and a flashing mode.

8. The device of claim 1, wherein said device is configured as a belt.

9. The device of claim 1, wherein said device is configured as a pet leash.

10. The device of claim 1, wherein said device is configured as a pet collar.

11. The device of claim 1, wherein said printable layer is weatherproof.

\* \* \* \* \*